Figure 5:
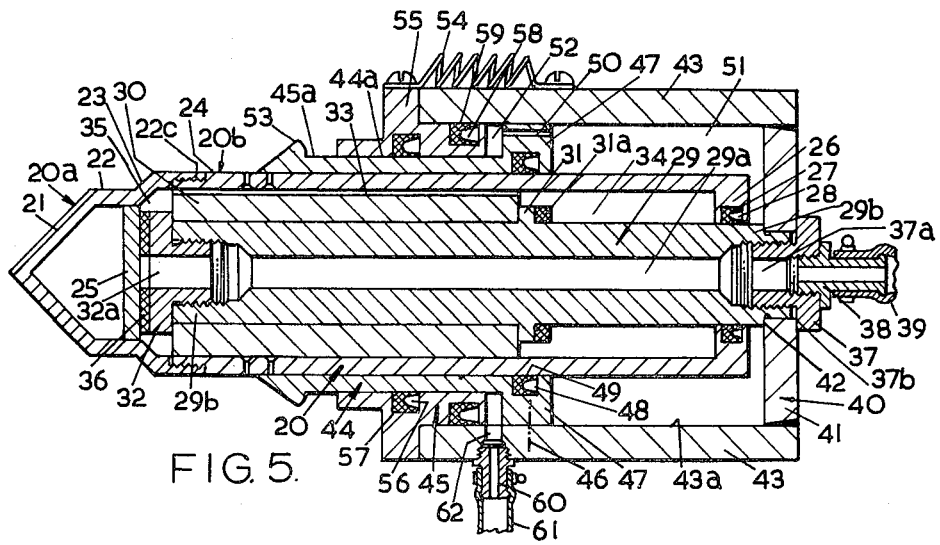

United States Patent [19]

Parmann

[11] 3,929,958
[45] Dec. 30, 1975

[54] PROCESS FOR PRODUCING RADIALLY-EXPANDED SOCKET ENDS ON THERMOPLASTIC PIPE LENGTHS

[75] Inventor: Gunnar Parmann, Mathopen, Norway

[73] Assignee: Rieber & Son Plastic-Industri A/S, Bergen, Norway

[22] Filed: Jan. 23, 1975

[21] Appl. No.: 543,547

Related U.S. Application Data

[60] Continuation of Ser. No. 366,677, June 4, 1973, abandoned, which is a division of Ser. No. 246,217, April 21, 1972, Pat. No. 3,776,682.

[30] Foreign Application Priority Data

Apr. 26, 1971 Norway.............................. 1538/71
Sept. 27, 1971 Norway.............................. 2386/71

[52] U.S. Cl. ................. 264/249; 264/296; 264/322
[51] Int. Cl.² ............................................ B29D 3/02
[58] Field of Search ........... 264/320, 322, 294, 296, 264/249, 92

[56] References Cited
UNITED STATES PATENTS

| | | | |
|---|---|---|---|
| 3,520,047 | 7/1970 | Muhlner .......................... | 264/92 X |
| 3,728,065 | 4/1973 | Figwer ............................ | 425/392 |

FOREIGN PATENTS OR APPLICATIONS

| | | | |
|---|---|---|---|
| 589,129 | 1959 | Italy.................................. | 264/320 |

*Primary Examiner*—Richard R. Kucia
*Attorney, Agent, or Firm*—Kenyon & Kenyon Reilly Carr & Chapin

[57] ABSTRACT

Process for producing radially expanded socket ends on pipe lengths of thermoplastic material. An appropriately heated pipe end is fashioned over a shape-conferring means comprising a substantially cylindrical drift, a mould element for forming an internal, radially expanded peripheral groove in said end and support means mounted on said drift and axially displaceable relative thereto. The support means is maintained in a desired position with a view to locating the mould element in the face of a pushing-on force from the pipe and as drift, mould element and support means are caused to be led in succession axially into the hot pipe end. Subsequent to the desired insertion of the mould element in the hot pipe end, the support means is axially displaced relative to the drift outwardly from the pipe end, thereby enabling elastic forces in the radially expanded pipe end to be drawn radially inwards against the drift and said end to be fashioned by the mould element into the required form. The mould element and fashioned pipe end are then subjected to cooling prior to their joint removal from the drift.

9 Claims, 16 Drawing Figures

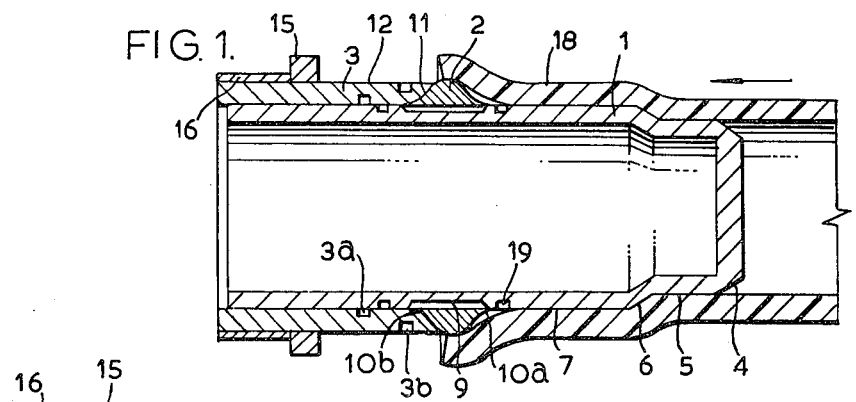
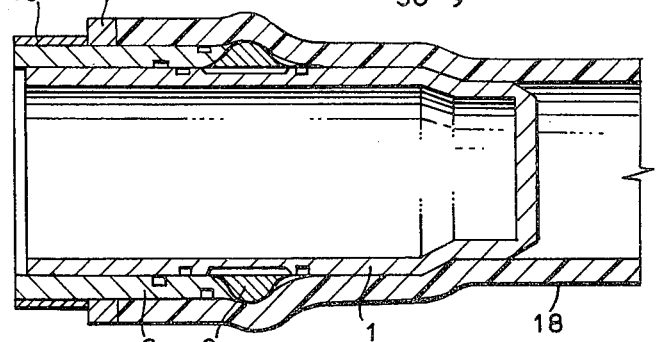
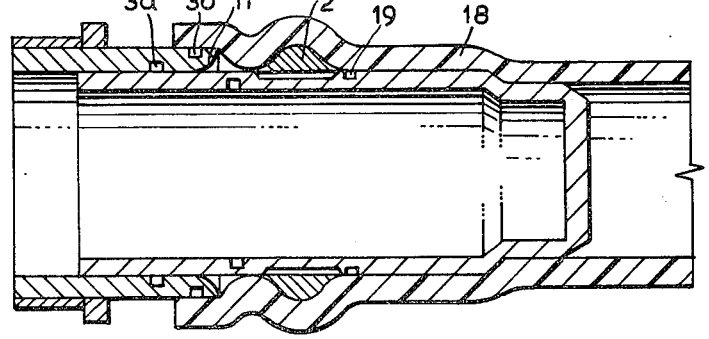
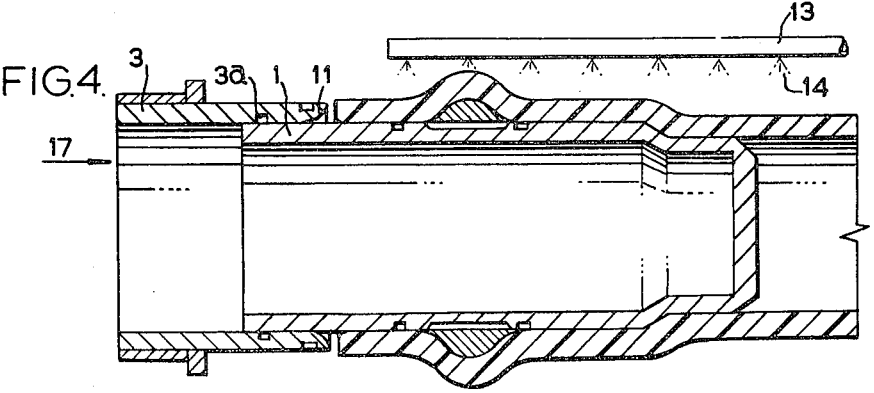

PROCESS FOR PRODUCING RADIALLY-EXPANDED SOCKET ENDS ON THERMOPLASTIC PIPE LENGTHS

This is a continuation of application Ser. No. 366,677, filed June 4, 1973 and now abandoned which in turn is a division of application Ser. No. 246,217 filed Apr. 21, 1972, now U.S. Pat. No. 3,776,682.

This invention relates to a process and apparatus for producing radially expanded socket ends on thermoplastic pipe lengths.

By the expression "pipe length" is to be understood herein both conventional pipe lengths which can be used directly as finished pipe sections in a pipe connection, together with such pipe portions or pipe butts which are designed to be either fixedly adhered or secured in another manner to another pipe length so as to form a finished pipe length having a socket end. In particular there shall be mentioned as an example of such a pipe butt a shape-conferring reinforcing element which in itself, for example at the place of use, can serve as a shape-conferring element for another unworked end of a pipe length and after bestowing the shape can serve as a shape-stabilising reinforcing element.

In the manufacture of pipe lengths having socket ends it is usual firstly to produce a cylindrical, uniformly thick pipe stock, which is afterwards cut into suitable pipe stock lengths, and thereafter in a separate operation is formed with a socket end by shaping the pipe end in a heated condition by way of a shape-conferring element, so as to be finally cooled off to a shape-stable condition before the formed socket end can be removed from the shape-conferring element.

In the manufacture of pipe lengths having socket ends, the formed end of the pipe length is subjected to elastic stresses during the forming as a consequence of the radial expansion of the end of the pipe length. If sufficient support of the formed pipe end is not provided for while it is soft after heating, the elastic stresses in the material can bring the material back to substantially the original condition. By cooling down in association with a suitable support the formed pipe end "is frozen" to a shape-stable condition.

Hitherto the manufacture of pipe lengths having socket ends has been effected with rather complicated equipment and in rather a time-demanding manner. As a consequence of the complicated equipment there have been difficulties in being able to achieve sufficiently rapid cooling, so that the cooling down time has been disproportionately long and this part of the manufacture has constituted a significant bottle neck in the pipe production process. In so-called pressure-free pipes, for example discharge pipes and drain pipes, the lengths of pipes are fitted together by quite simply pushing one, unworked or only worked to an insignificant degree end of the one pipe length as an insert end in a socket end of another pipe length. The insert end can if desired be obliquely chamfered so as to facilitate the pushing into the socket end of the other pipe length. It is usual to produce such pipe lengths from relatively thin-walled pipe stock and to produce the socket end by blowing the corresponding end of the pipe stock in a heated condition outwards against externally arranged mould contours which after conferring the shape and cooling of the formed socket end are drawn radially outwards from the socket end so as to be released from the radially expanded parts of the worked pipe length end. Even if the externally arranged mould contours are themselves relatively complicated, such a manufacturing apparatus is essentially simpler than the apparatus which is used for other types of pipe, such as pressure pipes, for example pressure water pipes.

It is important that the socket end is produced with sufficiently small dimensional tolerances in order to ensure a tight joint connection and precisely cooperating connecting parts. The said socket-manufacturing apparatus having external contours and having an internal blowing apparatus so as to blow the pipe end outwards against the mould contours, is not suitable for use in the production of socket ends for pressure pipe lengths without the employment of complicated self-sealing rubber gaskets.

The most important reason for this is that with such shaping there is only obtained an external calibration so that the necessary internal dimensional tolerances in the socket are not obtained. To form internally calibrated socket ends on pressure pipe lengths there has hitherto been utilised a drift element having therein radially expanding mould contours which are controlled by an axially displaceable shaft in the drift element, as is evident for example from Norwegian Pat. No. 116,988, and other jaws so as to ensure that the pipe end conforms to the contours of the mould element.

There is also disclosed in German Patent Publication No. 1,172,418, a socket-producing apparatus which is much used by virtue of its simple construction and hence relatively inexpensive design. This apparatus must also be used in combination with external jaws so as to be able to clamp the pipe to be fashioned about the contours of an internal mould element made up of four parts. The four parts must be withdrawn with the pipe after the latter has been shaped and cooled and thereafter they have to be knocked out of the pipe end before they can be assembled anew which is clearly inconvenient and time-consuming.

In general, the known socket-production devices are relatively expensive to provide, since they consist of many moving parts with small dimensional tolerances. Furthermore the apparatus is relatively complicated and demands constant maintenance work. The complicated apparatus prevents furthermore on constructive grounds a desired rapid and effective cooling of the formed socket end. The externally arranged jaws prevent effective cooling of the outer side of the socket end and visual control of the socket operation and the internally arranged mould contours prevent a corresponding effective cooling from the inside of the socket end.

Further an external largely cylindrical drift having thereon as axially displaceable mould element for forming the peripheral groove which is to receive the associated sealing ring is known. After producing the socket end the mould element can be removed from the drift together with the formed socket end and can be left in the latter to form the associated permanent sealing element in the socket end. A mould element is shown in the form of a sealing ring received between two rigid support rings. The two support rings are supported individually, the one from the inner side of the drift by means of outwardly projecting support pins through the inner wall of the drift which are controlled by a separate control rod and the other is supported endwise and on the outer side by means of an axially displaceable support ring on the outer side of the drift, while the sealing element itself is supported externally by means of a further axially displaceable support ring. The support arrangement is relatively complicated and especially that which is located internally in the drift complicates a desired cooling internally in the drift. Furthermore there is proposed a drift having radial bores between a central vacuum duct and the outer surface of the drift so as to draw by means of a vacuum the pipe stock material inwards against the shape-conferring element which consists of the drift and the separate mould element.

The last-mentioned solution does not allow the pipe end to be formed with the same internal diameter on both sides of the sealing element and is therefore only useful in practice in connection with a rigid supporting ring to prevent the sealing ring from being forced axially out of the groove by internal pressure when used in a pipe line.

Said last-mentioned solution further requires plastic materials with especially good elastic properties to make it possible for the pipe end to shrink and seal against the drift in order to achieve the necessary vacuum effect without causing a prohibite great internal diameter on the outer end of the socket.

An object of the present invention is to be able to produce socket ends on pipe lengths, relatively rapidly and easily with especially small dimensional tolerances while employing an especially simple manufacturing apparatus.

According to the present invention a process for producing radially expanded socket ends on pipe lengths of thermoplastic material comprises fashioning an appropriately heated pipe end over a shape-conferring means comprising a substantially cylindrical drift, a mould element for forming an internal, radially expanded peripheral groove in said end and support means mounted on said drift and axially displaceable relative thereto, by:

a. causing the drift, the mould element and the support means to be led into the hot pipe end while the mould element is supported by the supporting means against a pushing on force from said pipe, and by
b. retracting the support means axially outwards from the pipe end subsequent to the insertion of the mould element in a desired position in the latter and thereby enabling the radially expanded pipe end to be formed radially inwards against the drift and said end to be fashioned into the required form.

In a process according to the invention, the support means is initially used to maintain the mould element in non-displaceable abutting relationship therewith against the pushing-on force exerted by the hot pipe end, said support means also serving as a guide for said end enabling a predetermined length of thermoplastic material to pass over said mould element and outside the support means.

The invention involves the formation of a gap between the mould element, the support means, the drift and the pipe end during the axial retraction of the support means relative to the pipe end.

In case of polyethylene and similar thermoplastic materials it will be desirable to suck out the air from said gap by means of a vacuum pump and thereby sucking the intermediate portion of the pipe end on to the drift and the mould element during the retraction of the support means in axial direction relative to the pipe end.

In case of polyvinylchloride and similar materials with better elastic properties than polyethylene the elastic forces integral therewith will alone force the pipe end to shrunk on to the drift after the axial retraction of the support means and thereby making a seal against the drift to allow air to be sucked out of the gap between the pipe end and the drift.

The invention also includes an apparatus for carrying out the afore-mentioned novel processes which comprises a. means for applying heat to thermoplastic material of the pipe end for permitting radial expansion of the latter,
b. a shape-conferring means comprising a substantially cylindrical drift, a mould element for forming an internal, radially expanded peripheral groove in said end, and support means mounted on said drift and axially displaceable relative thereto,
c. means for axially displacing the support means relative to the drift and for maintaining the support means in a desired position on the drift to support the mould element against the pushing-on force of the hot pipe end,
d. means for applying a pushing-on force to said pipe end with respect to said shape-conferring means,
e. means for cooling the pipe end as it is supported over drift and mould element to bring said pipe end into a shape-stable condition, and
f. means for jointly removing the mould element and the fashioned pipe end from the drift, the form of the support means being such as to enable the mould element to be located in a desired position in the pipe end.

In one form of apparatus for carrying out the process of the invention, the outer surface of the drift is formed with a row of parallel, axially extending longitudinal slots for non-displaceable positioning of the mould element thereupon, each slot providing openings just in front and just behind the mould element so that the air pressure prevailing on either side of the latter is the same.

In an alternative apparatus for carrying out the process of the invention, the support means consists of a first member axially displaceable upon a second stationary member, the drift forming part of a piston-cylinder arrangement adapted to be driven by pressure medium and being axially movable relative to said second member thereby enabling the outermost portion of the pipe end to be pushed and respectively withdrawn from said second member while the remainder of the pipe end bears against the drift and axial movement of the first member forming an intermediate groove for locating the mould element relative to the pipe end, the arrangement being such that the two-membered support means permits axial displacement of the pipe end over groove-defining portions of the first and second members while a pushing together of said members forces the mould element outwards relative to said members.

It is the support means which represents the kernel of the present invention and which opens up so many new possibilities for fashioning a socket end with a circular groove for the reception of a sealing element.

The mode of operation and design of the support means is suitable for dissimilar forms of mould element which the support means serves to locate in the hot pipe end. On the withdrawal of the support means from the hot pipe end subsequent to the insertion and positioning of the mould element therein, the pipe end is permitted to be drawn down about the mould element and the drift.

When the annular mould elements employed, which are normally relatively rigid, are not to be left in the finished socket end but, on the contrary, are to be removed from the latter for replacement by a sealing element, such elements are conveniently constructed so as to drive obliquely in a radial direction. The division makes it possible to remove the rigid element from the peripheral groove in the finally formed and shape-stable socket end. In order to grip such divided mould elements firmly about the drift during the pushing-on of the hot pipe end so as to be able to achieve a reliable entry of the pipe end, the abutting surface of the support member with the mould element in the apparatus for carrying out the process of the invention is designed so that the latter element is squeezed down against the drift by the axial pushing-on force of the hot pipe end. The surface of the mould element forms a keyed termination against the drift so as to ensure, on the one side, entry of the hot pipe end and, on the other side, a reliable keying action against the correspondingly shaped abutment surface on the support means when the hot pipe end presses the mould element into abutment with the support means. As a result of the keying action, the mould element is pressed together and down on to the drift into a firm engagement therewith thereby ensuring a good entry of the hot pipe end. By such direct shaping about the mould element, the latter can be formed from spring steel, rigid thermoplastics or rubber. On using rubber or similar materials, the mould element can be undivided so as to remain behind within the socket as a sealing element for use as a seal in socket joints.

On utilising a mould element which is not fashioned with a material-entering edge for the hot pipe end but has, for example, a trapezoidal or dove-tailed cross-section where the short side of the trapezoid or dove-tail abuts against the drift after withdrawal of the support means from the pipe end, there is employed a two-part support means for securing and inlaying the mould element. The object in this case is to shape the pipe about the mould element which is to remain securely anchored within the finished socket end thereby forming a sealing element for later use in a socket joint.

The anchoring of the mould element in the socket end is produced by the hot pipe end shrinking over the contours of the mould element and surrounding them with a trapezoidal or dove-tailed groove.

Sockets having a permanently anchored sealing element represents a significant technical advance since the assembly time is reduced and a guarantee that the sealing element will remain in the correct position during assembly of the pipe joints is provided. In particular for pipes having a relatively large diameter, loosely inlayed sealing elements fall out of their associated annular grooves during assembly because of small rigidity.

The socket principle according to the invention makes available from a constructional viewpoint a series of dissimilar ways of removing the finally formed and shape-stable socket ends from the drift. A simple arrangement involves relative axial movement between drift and support means so that the latter abuts the socket end and leads it away from the drift. Alternatively, the cylindrical drift can be led axially backwards, and in a direction away from the shape-stable socket end, holding the socket back by abutment between the radially expanded annular groove thereof and an externally arranged device.

Figure 6:
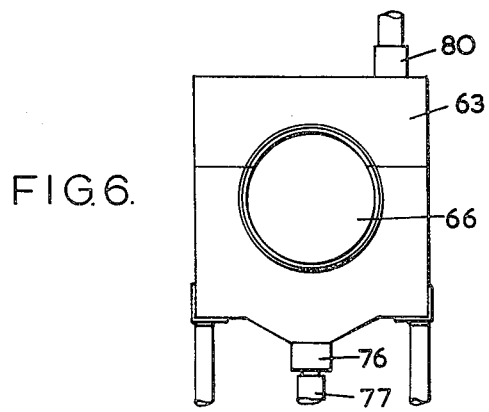
Figure 7:
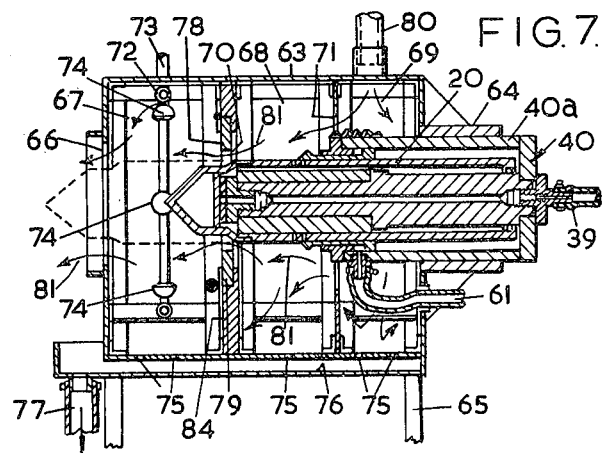
Figure 8:
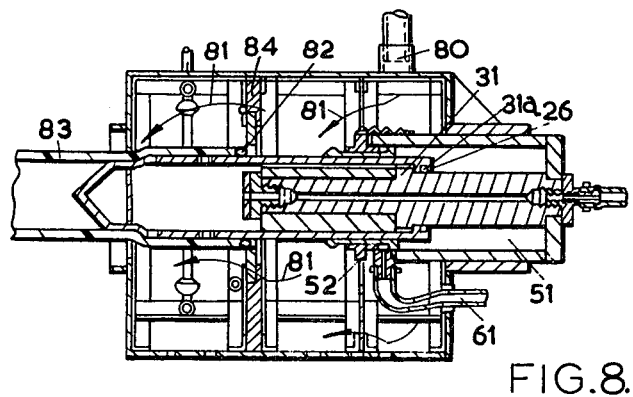
Figure 9:
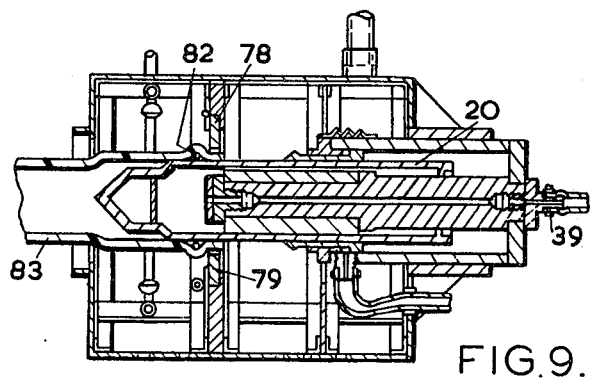
Figure 10:
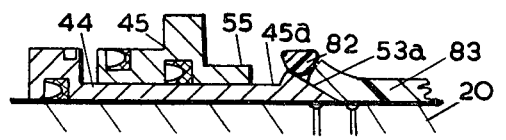
Figure 15:
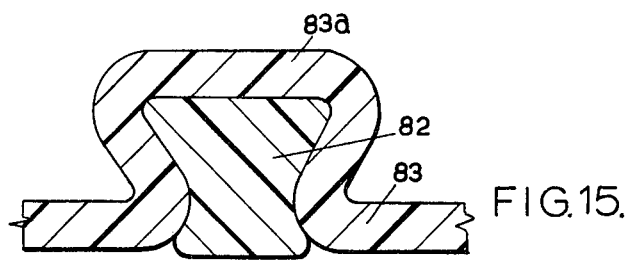
Figure 16:
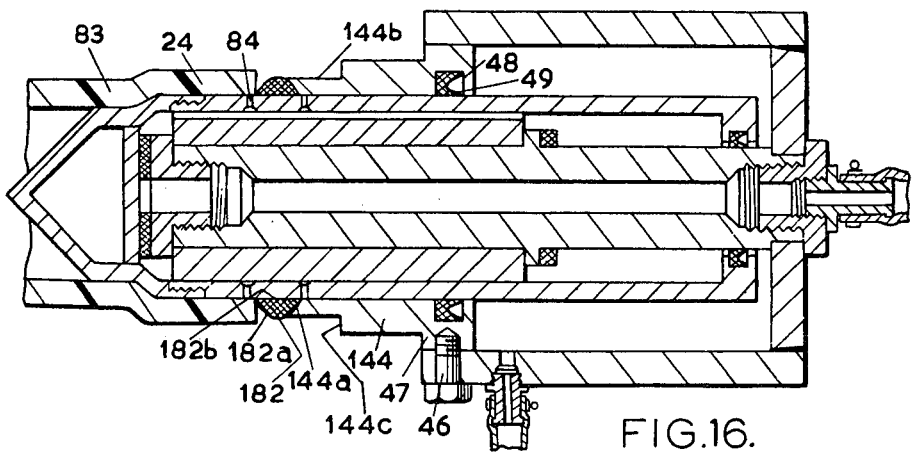

In order that the invention can be more clearly understood, convenient embodiments thereof will now be described, by way of example, with reference to the accompanying drawings in which:

FIG. 1 to 4 are sections, somewhat schematic, illustrating four successive steps of the socket production according to a first embodiment, FIG. 5 is a section, on an enlarged scale, of portions of the apparatus according to a second embodiment shown in a starting position, FIG. 6 is an end view of the apparatus, FIG. 7 is a sectional side view of the apparatus with the drift shown in the starting position, FIG. 8 is a sectional side view of the apparatus after the pipe stock end has been threaded on to the drift, FIG. 9 is a sectional side view of the apparatus during the final phase of the production of the socket end, FIGS. 10 to 14 are sections of the support member on an enlarged scale and during the various steps of the production of the socket end, FIG. 15 is a section, on an enlarged scale, of the sealing element after it has been securely anchored in the socket end, and FIG. 16 is a section, on an enlarged scale, of an apparatus according to another enbodiment.

Referring to FIGS. 1 to 4, various stages in the formation of a socket end on a pipe length are illustrated. The pipe length is formed from a pipe stock of polyvinyl chloride, but can alternatively be formed from another suitable elastomeric material, such as polyethylene or the like. In the illustrated embodiment, there is only shown a section of one end of the pipe length. Such a socket end-carrying pipe length can be provided at the opposite end with an unworked or only slightly worked insert end which can be adapted to be received fluid-tightly in a socket end of an abutting length of pipe. For this purpose a pipe stock end 18 is formed into a socket having an annular internal groove for the reception of a sealing element.

The apparatus for the production of the socket end on the stock of the pipe length as shown in FIGS. 1 to 4 schematically in the form of a shape-conferring element. The shape-conferring element comprises a drift 1 and an annular separate mould element 2 together with a sleeve-shaped support member 3 axially displaceable on the drift. The drift 1 is formed from a rust-free, relatively thin-walled steel pipe the leading edge 4 of which is slopingly chamfered and extends over into a first cylindrical outer surface 5. The surface 5 extends further via a conical surface 6 over into another longer cylindrical outer surface 7 having a somewhat larger diameter than the surface 5. On the outer surface 7 of the drift there is formed an O-ring groove with O-ring 19 and a longitudinal slot 9 below the mould element 2 having an opening 10a discharging freely outwards just in front of the mould element and having an opening 10b discharging freely outwards just behind the mould element, so that the same air pressure prevails in front of the mould element as behind the mould element. There can be disposed a series of such slots 9 having opposite openings 10a and 10b, in parallel by the side of each other along the periphery of the drift. The mould element 2 can be placed axially into position on the drift in abutment with the support member 3 and is then permanently located relative to the openings 10a, 10b. The annular mould element is formed in the illustrated embodiment from relatively rigid material, more precisely from an internally reinforced rubber ring but can, as required, be formed from another arbitrary suitable material, for example acetal, nylon or the like. The support member 3 is formed with an edge surface 11 corresponding to the rear surface of the mould element 2 in order to ensure an effective support for the mould element. The outer surface 12 of the support member is adatped to form an internal guide for the pipe stock end gradually as the latter is pushed past the mould element 2.

In FIG. 1 the pipe stock end is shown in a heated condition during a first phase of the pushing onto the shape-conferring element 1, 2 where there is shown the pipe stock end pushed on top of the element 2. In FIG. 2 the pipe stock end is shown in the fully pushed on condition and pushed into position outside the support member 3. Already in this first phase of the shaping operation, for example in the latter part of this phase, just before the pipe stock end is brought into the fully pushed-on state, there is the possibility of placing the region in front and to the rear of the mould element under vacuum using a vacuum pump (not shown) via a conduit connection (not shown) for example in the wall of the drift, so as to ensure that the pipe stock material fits exactly into place over the mould element.

The support member 3 has fixed thereto a coller 15 making it possible to displace the former axially into a desired position in the pipe end and locate it there. Behind a coller 15, the support member is provided with a heating band 16 which is regulated so that the support member can be maintained at a given temperature.

After locating the support member 3 and the mould element 2 is the required position on the drift 1 as shown in FIG. 1, the end 18 of the heated pipe stock is pushed over the drift, mould element and support member into abutment with the collar 15 (see FIG. 2).

During this pushing-on operation, the pipe stock end is expanded and forms a firm grip aroung the drift. When the end 18 bears against the mould element 2, the latter is pressed against the edge surface 11 of the support member 3 as well as down into a firm engagement with the drift as a consequence of the keying action between the support member and the mould element.

The heating band 16 ensures that the heated pipe end is maintained sufficiently hot during shaping about the support member that the elasticity of the pipe end is retained. By heating the support member, the heating band counteracts too rapid a cooling of the pipe end during the final shaping phase immediately before the support member is drawn out.

In FIG. 3 there is shown a position in a second phase of the shaping operation. The second phase commences with the axial displacement of the support member 3 in a direction away from the mould element 2. During this axial displacement the support member 3 can if necessary serve as a vacuum pump between the outer surface 7 of the drift and that portion of the pipe stock end which forms an abutment against the support member. O-rings 3a and 3b are shown in the inner and outer surfaces respectively of the support member 3 for sealing off the gap between the support member 3 and the outer surface 7 of the drift and the support member 3 and the pipe end 18 respectively.

By the axial movement of the support member 3 in a direction out of the pipe stock end 18, a lower air pressure arises in the gap which is formed between the support member and the mould element 2 than the atmospheric pressure which presses on the pipe from the outside. As a consequence of the openings 10a and 10b of slot 9 below the mould element 2, the same pressure is obtained on both sides of the latter. O-rings 3a, 3b, and 19 ensure that the low pressure is not punctured by leakages to the surrounding atmosphere. The lower pressure in the openings 10a and 10b on both sides of the mould element can, if desired, be further reinforced by sucking air out via bores in the drift with a vacuum pump (not shown) mentioned previously. By virtue of the low pressure in the gap on both sides of the mould element, the pressure of the atmosphere against the hot pipe end makes possible a more rapid and firm contraction of the pipe end about the mould element and the drift.

The shaping of the pipe stock material while the material is still sufficiently hot enables the inner elastic stresses in the material, which occur in front of the mould element 2 as a consequence of the radial expansion of the material, to be relieved and thereby to participate in drawing the pipe stock material radially inwards against the outer surface 7 of the drift. With the aid of the slots 9 below the mould element 2 the accidental displacement of the mould element as a consequence of the vacuum formation which is produced by the axial displacement of the support member and a possible extra vacuum pump, can be prevented.

In FIG. 4 there is shown the finally formed socket end after the support member has been drawn completely out of the pipe end. At 13 there is shown an externally arranged water rinse conduit having jet mouths 14 disposed in a suitable manner around the socket end and directed inwardly towards the latter. After the socket end has been suitably cooled down into a shape-stable condition the support member 3 can exert, as indicated by the arrow 17, a pushing force against the socket end and can push the latter together with the associated mould element axially from the drift 1. The mould element in the illustrated embodiment can if desired be designed as a sealing element for the socket joint.

The apparatus as shown in FIG. 5 forms the main apparatus according to the invention, while additional equipment for the apparatus is included in FIGS. 6 and 7.

A drift 20 having a front point end 21 is shown which extends over into a short cylindrical first threading-on portion 22. The drift continues further from the portion 22 via an oblique portion 23 over into a cylindrical main portion 24. The drift is hollow and consists of two sections 20 and 20b which are joined together at 22 at the beginning of the main portion 24. Internally in the section 20a there is designed a transverse support wall 25 and at the rear end of the main portion 24 there is present a radially and inwardly extending flange 26 having a sealing ring 27 received in an annular cavity 28. The sealing ring forms a seal against the outer surface of one end portion 29a of a hollow shaft 29. The drift 20 is displaceably received on a guide 30 which is fixed on the shaft 29 between a central annular projection 31 and a nut 32 on the other end portion 29b of the shaft. In the guide 30 there is formed an axially extending groove 33 which provides communication between a rear chamber 34 and a forward chamber 35 between the drift 20 and the shaft 29. At the end surface of the nut 32 there is secured a rubber washer 36 which in the position in FIG. 5 forms a stop abutment against the support wall 25. The stop abutment can if necessary break the communication between the chamber 35 and the bore 32a of the nut 32 and the bore 29a of the shaft 29 in the illustrated inner position. The bore 29a of the shaft 29 communicates via a bore 37a is a second nut 37 with a nipple 38 to which there is fixed a conduit 39 which accordingly to need can be coupled to a vacuum source (not shown).

The shaft 29 is secured to a holder 40 by virtue of the end wall 41 of the holder being rigidly clamped between a shoulder portion 42 on the end portion 29b of the shaft 29 and the flange portion 37b of the nut 37. The holder 40 is provided with a skirt portion 43 having an internal cylindrical surface 43a. A support means 44, 45 is received in a gap between the drift 20 and the skirt portion 43 of the holder 40. A first member 44 of the support means is permanently screwed with screw bolts as indicated at 46 via a rear flange portion 47 to the skirt portion 43 of the holder. The support member 44 which is axially displaceable on the drift 20 is provided in the region of the flange portion 47 with an internal groove 48 in which there is received a sealing ring 49 which forms a seal between the drift and the support member. Through the flange portion 47 there extends a throttle bore 50 which provides communication between a chamber 51 formed between the drift 20, the inner side of the holder 40 and the flange portion 47 of the support member 44 and a chamber 52 between the inner surface 43a of the skirt portion 43, the support member 44 and a rear surface of the support member 45. The support member 45 is axially displaceable on the support member 44 along a main portion 44a of limited axial extent between the position shown in FIG. 5 and a stop-forming projection 53 at the outer end of the support member 44, against the force of a tension spring 54 which is fixed with the one end to the skirt portion 43 of the holder and with the other end to the stop-forming flange portion 55 of the support member 45. In an internal annular groove 56 in the support member 45 there is received a sealing ring 57 which forms a seal against the support member 44 and in an external annular groove 58 there is received a sealing ring 59 which forms a seal against the skirt portion 43 of the holder. In the skirt portion 43 of the holder there is fixed a nipple 60 having an associated conduit 61 with a connection to a source of compressed air (not shown). The nipple 60 is inserted in a bore 62 in the skirt portion 43 and the bore communicates with the chamber 52 between the support members 44 and 45.

In FIGS. 6 and 7 there is shown a housing 63 which via a retaining sleeve 64 supports the outer end portion of the skirt portion 43. The housing 63 rests on a base having a frame construction 65 and is provided in front, as shown in FIG. 6, with a circular opening 66. Axially inwards into the housing, reckoned from the opening 66 there are partitioned off three chamber section 67, 68 and 69 which communicate relatively freely with one another via passages 70, 71. In the first chamber 67, which forms a discharge member for hot air and an insert chamber for a pipe stock end which is to be treated, there is located an annular cold water pipe 72 having a feed end indicated at 73 and having discharge jets indicated at 74. At 75 there are shown drain holes to a collecting trough 76 having an associated discharge 77. Between chamber 68 and chamber 67 there is arranged two hinged flaps 78 and 79 which are provided with supporting springs to maintain the same in the shown position, where they rest against base members 84. The innermost chamber 69 is connected via a feed conduit 80 to a hot air source (not shown). The passage flow of the hot air through the housing 63 is illustrated by means of the arrows 81.

FIGS. 10 to 14 show in detail the functioning of one embodiment of the supporting means during the manufacturing process.

In FIG. 15 there is shown a section of the finally completed pipe end having an associated sealing element fixed in the latter by a keying action. The pipe stock material is drawn inwards towards the drift from the position in FIG. 14 to the position in FIG. 15 by means of the vacuum effect which is produced by the bores 84 on opposite sides of the element 82.

MODE OF OPERATION OF THE APPARATUS

In FIG. 7 the apparatus is shown in the starting position in full lines. The vacuum in the conduit 39 is rejected, the compressed air supply to the conduit 61 is cut off, the cooling water in the pipe 72 is cut off and the hot air supply via the conduit 80 is cut off.

Figure 11:
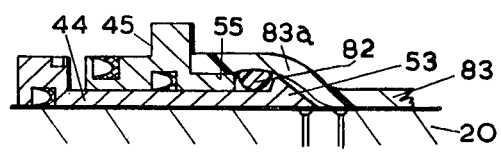

1. First a sealing ring-forming mould element 82 is applied on the drift portion 22 and is pushed inwards on the latter by threading on a pipe stock end 83 on the drift portion 22 on introduction through the opening 66 in the housing 63. The pipe stock is secured with a certain pushing-on force again the drift in a manner not shown further outside the housing 63.
2. Hot air is supplied to the interior of the housing 63 via the conduit 80 as indicated by the arrows 81. The pipe stock end is heated to a temperature of about 170°C.
3. Compressed air is supplied via the conduit 61 to the chamber 52 and via the bore 50 to the chamber 51. The pressure on the rear side of the flange 26 brings the drift towards the left in the drawing to the position which is shown in dotted lines in FIG. 7 and in this way the main portion 24 of the drift 20 is pushed inwards into the mould element 82 and the pipe stock end 83, during a first radial expansion of the pipe stock end, as is shown in FIG. 8, against the pushing-on force of the pipe stock. In this position the flange 26 forms an abutment against the projection 31 via a rubber washer 31a. The compressed air is cut off in the outer position illustrated in FIG. 8.
4. By means of the said pushing-on force against the drift from the pipe stock the drift 20 is now pushed back, with the pipe stock end pushed onto the drift to a maximum in an axial direction, towards the position which is illustrated in full lines in FIG. 7. In this way the support member 45 is maintained in abutment with the skirt portion 43 by means of the tension spring 54, so that there is formed an annular groove 45a (FIG. 10) between the support members of the support means 44, 45 which is ready to receive the mould element 82. During the backward guidance of the drift 20 the mould element 82 is fixed by the end edge of the pipe stock end 83 and during the elastic expansion of the mould element the latter is raised (see FIG. 10)

upwards along a sloping surface 53a on the front side of the projection 53 of the support member 44 in order finally to settle elastically downwards into the said annular groove 45a. The hot pipe stock end 83 is led further over the mould element 82 so as to form finally a support abutment against the flange portion 55 on the support member 45, as shown in FIG. 11.

Figure 12:
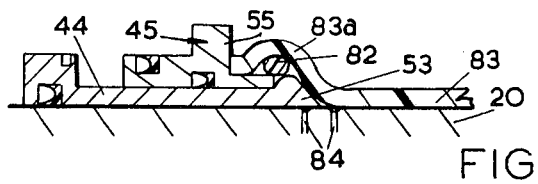
Figure 13:
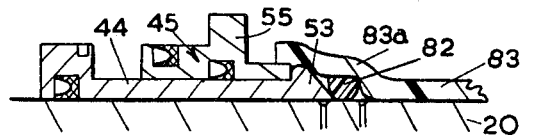
Figure 14:
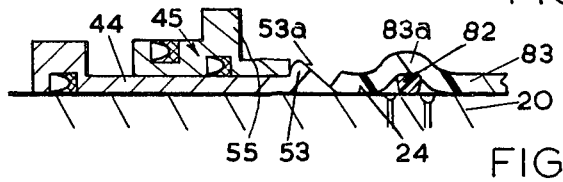

5. The pushing-on force of the pipe towards the drift ceases and compressed air is supplied afresh via the conduit 61. The compressed air first of all builds up pressure behind the moving member 45 of the support means, so that the support member 45 moves axially forwards on the support member 44 and as a result pushes the mould element 82 against its inherent elasticity outwards from tne annular groove 45a between the support members and produces a temporary local third radial expansion of the pipe stock end as shown in FIG. 12.

6. The compressed air flows further past the throttle bore 50 and builds up a new excess pressure behind the drift, so that the latter begins to move axially outwards through the housing 63, while bringing with it the pipe stock without a pushing-on force. The strongest expanded portion of the pipe stock and cooperates to hold the mould element 82 in place in the pipe stock end, while the latter is drawn off from the support member 45 and the projection 53 of the support member 44 and slides further against the main portion 24 of the drift 20. The air internally in the drift 20 is now drawn out via the vacuum conduit 39. Via the transverse bores 84 in the cylinder walls of the drift there occurs a pressure drop in the gap between the outer side of the drift and the pipe stock end and there occurs a corresponding increase in pressure on the outer side of the pipe stock end, so that the pipe stock end fits tightly about the mould element and forms an abutment against the drift on both sides of the mould element, as is shown in FIG. 15.

The mould element is adapted to be left after the formation of the pipe stock end in the finally finished pipe and in the form of an internal sealing element. In the embodiment which is illustrated in FIGS. 5 to 15 there is shown a mould element 82 of a special construction which is designed so as to be able to be left permanently in the formed pipe end in self-locking engagement, so that accidental release of the sealing element from the pipe end is prevented. In this connection a mould element is illustrated with a substantially trapezoidal cross-section. By means of undercutting the cross-section and the associated wedge form there can be obtained an effectiive fixing of the mould element to form a permanent sealing element as will be evident from FIG. 15.

7. In the fully pushed-out position of the drift the hit air is cut off and the water cooling is set into motion in the chamber 67 and the finally formed pipe stock end is cooled down to form a shape-stable socket end. The water cooling is terminated after the socket end has been suitable cooled off and assumes its desired shape-stable form.

8. The supply of compressed air to the drift is now disconnected and the drift is drawn back to the starting position by virtue of the force of the vacuum via the conduit 39. The shape-stable socket strikes the stop-forming flaps 78, 79 pivotable in opposite directions and is released from the drift as the latter is drawn past the flaps. The released pipe is drawn out of the housing 63 and is disposed in a rack for ready made pipes.

THE MOULD ELEMENTS AND SPECIAL APPARATUS FOR THE LATTER

In the afore-described embodiment there is utilised as a mould element and sealing element 82 an elastomer ring having a trapezoidal cross-section. The support means 44, 45 which is described above is specially designed for mould elements having special cross-sections, but can be employed for arbitrary cross-sections.

The novelty of this socket system lies firstly in making possible an insertion of arbitrarily shaped elastomer elements, in a ready manner, in heated thermoplastic pipe ends. Here special use of the thermoplastic properties of the pipe material has been drawn upon which makes possible a vigorous expansion and a later contraction.

In FIG. 16 there is shown an apparatus which corresponds substantially to the apparatus which is shown in FIG. 5, the only difference being that the support means 44, 45 is replaced by a support means having a single support member 144. The support member 144 is designed for a split ring 182 of acetal or similar rigid material which is not to serve as a sealing element but is to be removed after use. The support member is secured similarly to the support member 44 of FIG. 5, to the skirt portion 43 of the holder 40 with screw belts 46 via a rear flange portion 47 and in the region of the flange portion 47 the support member 144 is provided with an inner groove 48 in which there is received a sealing ring 49 which forms a seal between the drift and the support member.

The support member 144 is provided at its front edge with a support portion 144a which extends obliquely downwards and inwards, that is to say having a shape substantially similar to the side portion 182a on the associated specially produced elastomer ring or mould element 182 so that the edge surfaces during the pushing on of the hot pipe end will be pressed together and the ring will be pressed into abutment with the drift. The support member 144 is provided just behind the support portion 144a with a guide surface 144b which is terminated by a radially outwardly extending support surface 144c for the end surface of the pipe stock end.

The mode of operation of the support member 144 deviates from the mode of operation of the support members 44, 45 in that the mould element, after pushing on the main surface 24 of the drift, is pressed directly into abutment with the front portion 144a of the support member and is thereby forced into abutment with the drift as a consequence of the keying action at the abutting surface 144a.

The convenient embodiments described above with reference to the accompanying drawings, make available the following advantageous features:

1. The socket end is entirely formed about an internal shaping or moulding body so that optimum design and dimensional tolerances are obtained.
2. Pipes can be socketed having arbitrary thicknesses on the same apparatus without adjustments.
3. Pipes can be socketed having annular grooves of dissimilar groove shape, on the same apparatus by only changing the mould element.
4. The socket end can be formed directly about the sealing element.

5. The socket can be formed about the sealing element so that the latter is anchored in the socket end and there is obtained thereby a significant technical advance as regards assembly.
6. Socketing can be effected under total visual control due to the avoidance of externally arranged jaws.
7. The sockets are not exposed to the damage externally arranged jaws often apply thereto.
8. The sockets can be cooled intensively by direct water spraying.

What we claim is:

1. A process for producing a radially expanded socket end with a radially expanded groove for an inner sealing element on a pipe length of thermoplastic material comprising the steps of
heating one end of a pipe length,
positioning a circumferentially split mould element of rigid elastic material having a wedge shaped side face portion on a substantially cylindrical face of a drift, said face having larger diameter than the outside diameter of the pipe length,
positioning a removable support member on said drift to axially support the mould element on said drift, said support member having an abutting surface cooperating with said wedge shaped side face portion to force said mould element into abutment with said drift surface during an influence of a pushing-on force exerted by the hot pipe end,
moving the heated end of the pipe length relatively over the mould element, the support member and the drift to radially expand the heated end and to locate the heated end in a final position axially on the drift,
subsequently removing the support member from adjacent the mould element and the heated end while said heated end remains axially undisplaceable in said final position,
contracting the unsupported end of the heated pipe radially inwardly against said cylindrical drift face, and
subsequently cooling down such fashioned pipe end during support thereof in said final position by means of said mould element and said drift.

2. A process for producing a radially expanded socket end with a radially expanded groove for an inner sealing element on a pipe length of thermoplastic material comprising the steps of
heating one end of a pipe length,
positioning a mould element with a wedge shaped side face portion on a substantially cylindridal face of a drift, said face having larger diameter than the outside diameter of the pipe length,
positioning a removable support member on said drift to axially support the mould element on said drift, said support member having an abutting surface cooperating with said wedge shaped side face portion to force said mould element into abutment with said drift surface during an influence of a pushing-on force exerted by the hot pipe end,
moving the heated end of the pipe length relatively over the mould element, the support member and the drift to radially expand the heated end and to locate the heated end in a final position axially of the drift,
subsequently removing the support member from adjacent the mould element and the heated end which said heated end remains axially undisplaceable in said final position,
contracting the unsupported end of the heated pipe radially inwardly against said cylindrical drift face, and
subsequently cooling down such fashioned pipe end during support thereof in said final position by means of said mould element and said drift.

3. A process for producing a radially expanded socket end with a radially expanded groove for an inner sealing element on a pipe length of thermoplastic material comprising the steps of
heating one end of a pipe length,
positioning a mould element on a substantially cylindrical face of a drift, said face having larger diameter than the outside diameter of the pipe length,
positioning a removable support member on said drift to axially support the mould element on said drift,
moving the heated end of the pipe length relatively over the mould element, the support member and the drift to radially expand the heated end and to locate the heated end in a final position axially of the drift,
heating the support member to heat the pipe end during movement over the support member,
subsequently removing the support member from adjacent the mould element and the heated end while said heated end remains axially undisplaceable in said final position,
contracting the unsupported end of the heated pipe radially inwardly against said cylindrical drift face, and
subsequently cooling down such fashioned pipe end during support thereof in said final position by means of said mould element and said drift.

4. A process according to claim 3 which comprises initially using the support means to maintain the mould element in non-displaceable abutting relationship therewith against the pushing-on force exerted by the hot pipe end, said support means also serving as a guide for said end enabling a predetermined length of thermoplastic material to pass over said mould element and outside the support means.

5. A process according to claim 4 which comprises using the support means to push the radially expanded socket end from the drift after cooling the fashioned pipe end.

6. A process as set forth in claim 3 wherein said step of contracting the free end of the heated pipe includes the creation of a lower air pressure radially within the unsupported end than radially without said unsupported end.

7. A process according to claim 3 which comprises using said mould element as a sole mould element as well as a sealing element in the final product.

8. A process for producing a radially expanded socket end on a pipe length of thermoplastic material comprising the steps of
heating one end of the pipe length;
positioning a mould element of larger outside diameter than the inner diameter of the pipe length on a cylindrical surface of a drift adjacent the heated end of the pipe length;
positioning a support member axially adjacent to the mould member to axially maintain the mould member in a final position on the drift;

moving the heated end of the pipe length over the mould element and support member to radially expand the heated end;

heating the support member to heat the pipe end during movement over the support member;

subsequently removing the support member from adjacent the mould element; and contracting the free end of the heated pipe radially inwardly about the mould element and onto the cylindrical surface of the drift during removal of the support member.

9. A process for producing a radially expanded socket end with a radially expanded groove for an inner sealing element on a pipe length of thermoplastic material comprising the steps of:

heating one end of a pipe length, positioning a mould element on a substantially cylindrical face of a drift, said face having larger diameter than the outside diameter of the pipe length, positioning a support member on said drift face adjacent said mould element, moving the heated end of the pipe length relatively over said drift face to radially expand the heated end and to locate the heated end in a final position axially on the drift, moving the support member and the mould element which is supported axially on said drift by said support member relatively into the heated end to further radially expand said heated end, heating the support member to heat the pipe end during movement over the support member, subsequently removing the support member from adjacent the mould element whereas said heated end remains axially undisplaceable in said final position on the drift, contracting the unsupported end of the heated pipe radially inwardly against said cylindrical drift face, and subsequently cooling down such fashioned pipe end during support thereof in said final position by means of said mould element and said drift.

* * * * *

UNITED STATES PATENT AND TRADEMARK OFFICE
CERTIFICATE OF CORRECTION

PATENT NO. : 3,929,958
DATED : December 30, 1975
INVENTOR(S) : Gunnar Parmann

It is certified that error appears in the above-identified patent and that said Letters Patent are hereby corrected as shown below:

```
Column  6, line  1, "cylindriical" should be --cylindrical--
Column  7, line 12, "adatped" should be --adapted--.
Column  7, line 31, "coller" should be --collar--.
Column  7, line 34, "coller" should be --collar--.
Column  7, line 39, "is" should be --in--.
Column  9, line 12, "accordingly" should be --according--.
Column  9, line 66, "member" should be --chamber--.
Column 11, line 53, "effectiive" should be --effective--.
Column 11, line 56, "hit" should be --hot--.
Column 13, line 52, "cylindridal" should be --cylindrical--.
Column 14, line  1, "which" should be --while--.
```

Signed and Sealed this eighteenth Day of May 1976

[SEAL]

Attest:

RUTH C. MASON
Attesting Officer

C. MARSHALL DANN
Commissioner of Patents and Trademarks